US012436961B2

(12) United States Patent
Fitzmaurice

(10) Patent No.: US 12,436,961 B2
(45) Date of Patent: Oct. 7, 2025

(54) MACHINE LEARNING APPARATUS FOR DATA LINEAGE TRANSFORMATION

(71) Applicant: Bank of America Corporation, Charlotte, NC (US)

(72) Inventor: Colm Fitzmaurice, Winona, MN (US)

(73) Assignee: Bank of America Corporation, Charlotte, NC (US)

( * ) Notice: Subject to any disclaimer, the term of this patent is extended or adjusted under 35 U.S.C. 154(b) by 244 days.

(21) Appl. No.: 18/387,710

(22) Filed: Nov. 7, 2023

(65) Prior Publication Data

US 2025/0147747 A1 May 8, 2025

(51) Int. Cl.
*G06F 16/24* (2019.01)
*G06F 16/21* (2019.01)
*G06F 16/2458* (2019.01)

(52) U.S. Cl.
CPC ........ *G06F 16/2468* (2019.01); *G06F 16/219* (2019.01)

(58) Field of Classification Search
None
See application file for complete search history.

(56) References Cited

U.S. PATENT DOCUMENTS

| | | | | |
|---|---|---|---|---|
| 2015/0012478 | A1* | 1/2015 | Mohammad | G06F 16/254 707/602 |
| 2019/0243639 | A1* | 8/2019 | Bach | G06F 9/44505 |
| 2022/0374413 | A1* | 11/2022 | Gould | G06F 16/9024 |
| 2022/0374457 | A1* | 11/2022 | Parkhe | G06F 16/907 |
| 2025/0036402 | A1* | 1/2025 | Mekala | G06F 8/71 |

* cited by examiner

*Primary Examiner* — Augustine K. Obisesan
(74) *Attorney, Agent, or Firm* — Weiss & Arons LLP

(57) ABSTRACT

A machine learning ("ML") apparatus for self-service search and transformation of data lineage information is provided. The apparatus may include machine readable memory configured to store technical data element identifiers ("TDEIs") and a computer configured to receive a query for data lineage information corresponding to a first TDEI. The apparatus may include a processor configured to identify a level of commonality between the first TDEI and a second TDEI and determine whether the first TDEI and the second TDEI share a threshold level of commonality. Following a determination that the first TDEI and the second TDEI share a threshold level of commonality, the processor may identify any mismatches between the first TDEI and the second TDEI and determine whether a threshold number of mismatches exists between the first TDEI and the second TDEI. The processor may then transform the data lineage using ML.

20 Claims, 9 Drawing Sheets

Query Parameter

Columns
Specify the parameters for running the query.

Name: [LOT]

Scope: [*]

Tags: [Type or select tag]

Result must fit all tags ☐

Filter by DB System: [*XTP06*] ▽ [XTP06DBM01.SDL.CORP.BANK.COM] ▽

Filter by Database: [*] ▽ [NCIDWP01] ▽

Filter by DB Schema: [*KSCOPE*] ▽ [KSCOPE] ▽

Warning: The drill-down filter contains a limited list of 100 objects. You may define a more specific name pattern.

Filter by Table or View: [CIG] ▽ [CIG_TRADEBLOTTER] ▽

[Reset]  [Run] [Cancel]

FIG. 6

MACHINE LEARNING APPARATUS FOR DATA LINEAGE TRANSFORMATION

FIELD OF TECHNOLOGY

This disclosure is related to data lineage transformation. More particularly, the disclosure relates to a self-service search apparatus using machine learning ("ML") to transform data lineage information.

BACKGROUND

Stewardship of organizations typically requires organizational management to govern the flow of information. The flow may include acquisition, processing, storage, and distribution of the information, as well as other activities that involve the information. The stewardship may require that managers exercise control over the flow to satisfy the goals of the organization. The control may include imposing constraints on the flow, viewing information in the flow, auditing the characteristics of the flow, or other measures. The goals may include financial, strategic, regulatory, risk management goals, or other organizational goals. The goals are often set and understood by managers. The goals are often defined by or related to attributes of the information.

The information is often encoded, classified, and manipulated by machines in an information system. The encoding may require the formulation and storage of digital data elements.

The flow of a data element in the information system may be characterized by data lineage. The data lineage is typically expressed in terms of the encoding, the machines, and other technical attributes of the information system. Data lineage is the process of tracing the origin, transformation, and usage of data across multiple sources and systems.

The current data lineage request process requires a user to submit a request to a lineage team or to gain special access. Further, a technical interface may be challenging for a user trying to self-serve using a data identifier ("DI") tool. Currently, data lineage request processes only provide a drill down method. And a drill down method may take a day or longer to obtain results.

It would be desirable, therefore, to provide an apparatus, methods, and articles of manufacture for ML self-service search and discovery of data lineage using faster methods, including reverse methods and wildcard abilities.

SUMMARY OF THE DISCLOSURE

Apparatus, methods, articles of manufacture, code, and encoded media (individually or collectively, "the tool" or "the tools") for discovering and analyzing data in a complex machine information environment are provided. The complex information environment may be administered by an institution.

The environment may store and manipulate data information elements. The data information elements may represent a value, status, entity, or any other suitable element that may play a role in data decisioning, strategy, planning or execution. Illustrative data information elements may include social security number, income, location, age, occupation, credit rating, balance, account status, gender, family size, mortgage information, credit card information, customer-institution contact event, citizenship, customer behavior, corporate financial information, corporate finances, such as assets and debits, and other such elements. The institution may utilize 1, some, 10s, 100s, 1000s, millions or more of such elements.

Corporate governance may require that the storage, transformation, or usage of the data information elements be monitored or controlled.

The environment may be populated by technical data elements ("TDEs"). A TDE may represent one or more data elements. A TDE may be used to manipulate, store, or transform one or more data elements. A TDE may be a data field, a source code element, an object code element, any other suitable type of program instruction element, an information storage element, a processing element, a hardware element, or any other suitable element of the environment.

Each information element or technical data element identifier ("TDEI") may correspond to a TDE in the information environment. A TDEI identifies the data information within the TDE. The tools may provide such monitoring and control by providing monitoring or control of the TDEs that correspond to the TDEIs.

The tools may provide a cross-reference between a KDEI and a KDE. The KDEs may be cross-referenced to the TDEs. When a KDE is cross-referenced to a TDE, the TDE may be identified as the KDE. Corporate governance principles may be understood in terms of KDEs. The nomenclature, functionality, and interrelationships between TDEs and KDEs may be highly technical and cumbersome to work with when establishing monitoring or control programs. The cross-referencing between KDEs and TDEs may provide a way to implement the data principles in the information environment.

The tools may identify a TDE as a KDE. The tools may maintain a roster of the KDEs. The tools may provide a repository that serves as system of record ("SOR") for the KDEs.

The tools may receive from a user a query for data lineage information about a datum. The datum may be a TDE. The datum may be a TDEI. The datum may be a KDE. The datum may be a KDEI. The datum may be identified at a consumption point in the information environment. For example, the consumption point may be an analytical or reporting tool. A user or process may identify the datum at the consumption point and desire to discover lineage information of the datum. The lineage may be the lineage of the datum in the information environment. The query may identify the datum as a TDE. The query may identify the datum as a TDEI. The query may identify the datum as a KDE. The query may identify the datum as a KDEI. The tool may request the lineage information from a lineage generation engine.

The tool may provide to the user data lineage information. The data lineage information may include a lineage information element. The lineage information element may include graphical lineage information, textual lineage information, temporal lineage information, comparative lineage information or any other suitable lineage information. The lineage information element may include, for one or more times or periods of time, identity information, system of record information, transformation information, hop information, node information, or any other suitable information.

Currently, users may run data lineage searches for hours, days, and more. Only then may a user find a comparison ranking for a given data element. Thus, the present disclosure provides a self-service data lineage search apparatus that may maintain a reduced footprint on processing requirements.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which:

FIG. 6 shows yet another illustrative apparatus in accordance with the principles of the disclosure;

DETAILED DESCRIPTION OF THE DISCLOSURE

Figure 1:
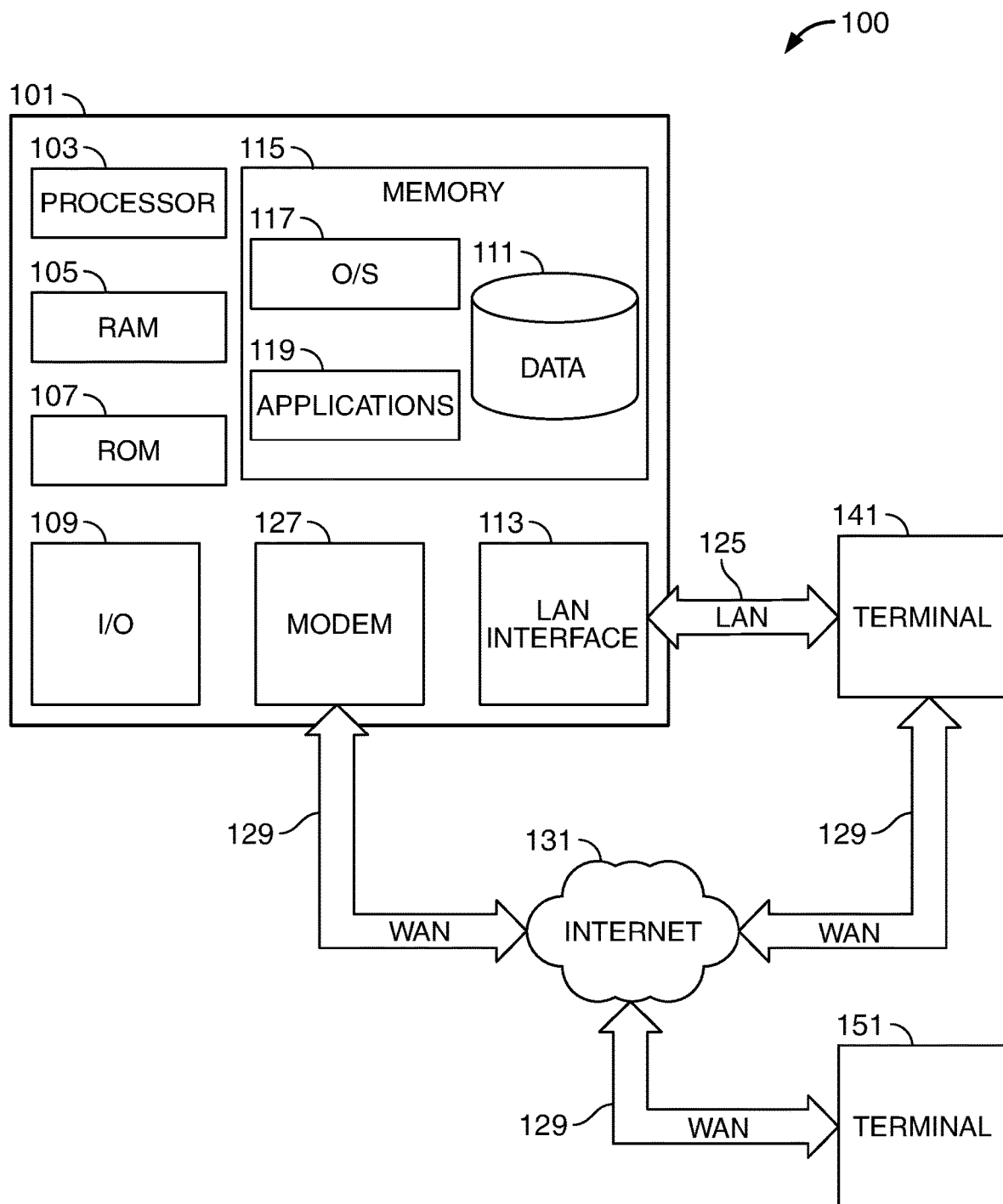
FIG. 1 shows an illustrative apparatus in accordance with the principles of the disclosure.

Apparatus, encoded media, methods, articles of manufacture, and instructions for a data lineage self-service search portal are provided. The apparatus may include a search portal. The search portal may be an ML-powered tool within a graphical user interface ("GUI") that enables data lineage analysis and transformation. The search portal may be used by human users, artificial intelligent ("AI") programs, and computer systems.

The apparatus, articles of manufacture, and methods may leverage ML to selectively update stored code with updated code. The stored code may correspond to data lineage information code. The updated code may correspond to corrected data lineage information.

The apparatus, articles of manufacture, and methods may include machine-readable memory. The machine-readable memory may be configured to store a plurality of TDEIs.

A TDEI may be a string of alpha-numerical values and symbols representing a code that corresponds to data lineage information. TDEIs may be created by users, AI programs, and computer systems. For example, a TDEI may be "XTP06DBM01.SDI.CORP.BANK.COM" corresponding to a particular server holding data lineage information. For example, a TDEI may be "KSCOPES" corresponding to a particular schema of data lineage information.

The apparatus, articles of manufacture, and methods may include a computer. The computer may be configured to receive a query for data lineage information corresponding to a first TDEI. The computer may be configured to leverage ML.

Data lineage information may be data, including metadata, regarding the flow of information—from origination to endpoint. For example, data lineage information may capture a server, database, schema, table/view, and column. The data lineage information may consist of metadata. The data lineage information may indicate who, what, where, when, why, and how data was originally input into a system. The data lineage information may include a history of data and how the data evolves over time.

The first TDEI may be associated with a first data lineage source. A data lineage source is a location or point of origination of data in a system.

The apparatus, articles of manufacture, and methods may include a processor. The processor may be configured to leverage ML. The processor may be configured to identify a level of commonality between the first TDEI and a second TDEI. The second TDEI may be associated with a second data lineage source.

A level of commonality may be a confidence level obtained by comparing alpha-numerical strings. A level of commonality may be set to a percentage of symbol matching between TDEIs. For example, a level of commonality may be set as TDEIs sharing 50%, 60%, 70%, 80%, or 90% of symbols in a correct order. A level of commonality may be set as TDEIs sharing 50%, 60%, 70%, 80%, or 90% of string length.

The apparatus, articles of manufacture, and methods may identify data lineage information for the second TDEI corresponding to the second data lineage source.

The apparatus, articles of manufacture, and methods may determine whether the first TDEI and the second TDEI share a threshold level of commonality. A threshold level of commonality may be set to a threshold number of symbol matches between TDEIs. A symbol match may be TDEIs having alpha-numerical symbols in the correct order. For example, a threshold level of commonality may be set as TDEIs having one, two, three, four, five, or more matches.

The apparatus, articles of manufacture, and methods may, following a determination that the first TDEI and the second TDEI share a threshold level of commonality, identify any mismatches between the first TDEI and the second TDEI. One mismatch may be, for example, one alpha-numerical symbol deviation.

An alpha-numerical symbol deviation may be, for example, "KSCOPE" vs. "KSCOPES." In that case, the last letter is either absent or an "S." Two alpha-numerical symbol deviations may be, for example, the following TDEIs: "JSCOPE" (first) and "KSCOPES" (second). In this case, the seventh letter of the first TDEI is absent ("JSCOPE") while the seventh letter of the second TDEI is an "S" ("KSCOPES"). This may be one alpha-numerical deviation. Meanwhile, the first letter of the first TDEI is a "J" ("JSCOPE") while the first letter of the second TDEI is a "K" ("KSCOPES"). This may be a second alpha-numerical deviation.

The apparatus, articles of manufacture, and methods may determine whether a threshold number of mismatches exists between the first TDEI and the second TDEI.

The apparatus, articles of manufacture, and methods may include an electronic switch. The electronic switch may be configured to, if a threshold number of mismatches does not exist between the first TDEI and the second TDEI, prompt the user to, using a GUI, replace the first TDEI with the second TDEI in storage locations. The electronic switch may be configured to, if a threshold number of mismatches exists between the first TDEI and the second TDEI, maintain the second TDEI in all storage locations. Storage locations may include, for example, servers, databases, schemas, table/views, and columns.

The apparatus, articles of manufacture, and methods may include a script to access a plurality of data files. The script may overwrite data lineage information in the data files. The script may generate a display on a GUI to prompt a user to overwrite the first TDEI with the second TDEI in storage locations containing the first TDEI. The overwriting may accelerate the running of the script. The overwriting may reduce a bandwidth of the computer.

The electronic switch may be configured to respond to a failure to determine a threshold number of mismatches existing between the first TDEI and the second TDEI. The electronic switch may be configured to take remedial action by generating a display on the GUI to prompt the user to input a new search query. Remedial action may be an ML technique to repair script or code to enhance computer functionality and efficiency.

The apparatus, articles of manufacture, and methods may include a plurality of TDEIs including a KDEI. The KDEI may unlock a barrier, including, for example, an electronic security barrier.

The apparatus, articles of manufacture, and methods may include data lineage information. The data lineage information may include historical data lineage information.

The apparatus, articles of manufacture, and methods may identify a threshold number of mismatches between TDEIs. For example, a threshold number of mismatches between TDEIs may be one mismatch, two mismatches, or more mismatches.

The apparatus, articles of manufacture, and methods may include a location for saving the plurality of TDEIs including at least one of a server, database, schema, table/view, and column.

The apparatus, articles of manufacture, and methods may include a query. The query may spawn a child query. A child query may be an additional query derived from a parent query. A child query may be a query that derives from a previous query.

The articles of manufacture may include a non-transitory computer usable medium having computer readable program code embodied within. The computer readable program code may, when executed by a processor, cause a computer to perform data lineage analysis within a self-service search portal.

The computer readable program code may be executed by a processor leveraging ML. The computer readable program code may cause a computer to perform data lineage analysis or a data lineage search. The data lineage analysis or a data lineage search may be done within a self-service search portal.

The computer readable program code may be used to cause the computer to store a plurality of TDEIs.

The computer readable program code may be used to cause the computer to receive a query for data lineage information. The data lineage information may correspond to a first TDEI associated with a first data lineage source.

The computer readable program code may be used to cause the computer to identify a level of commonality between the first TDEI and a second TDEI. The second TDEI may be associated with a second data lineage source.

The computer readable program code may be used to cause the computer to identify data lineage information for the second TDEI corresponding to the second data lineage source.

The computer readable program code may be used to cause the computer to determine whether the first TDEI and the second TDEI share a threshold level of commonality.

The computer readable program code may be used to cause the computer to, following a determination that the first TDEI and the second TDEI share a threshold level of commonality, identify any mismatches between the first TDEI and the second TDEI.

The computer readable program code may be used to cause the computer to determine whether a threshold number of mismatches exists between the first TDEI and the second TDEI.

The computer readable program code may be used to cause the computer to configure an electronic switch. The electronic switch may, if a threshold number of mismatches does not exist between the first TDEI and the second TDEI, prompt the user to, using an interactive UI, replace the first TDEI with the second TDEI in all relevant storage locations. The electronic switch may, if a threshold number of mismatches exists between the first TDEI and the second TDEI, maintain the second TDEI in all relevant storage locations.

The articles of manufacture may include a plurality of TDEIs including a KDEI. The KDEI may unlock a barrier including, for example, an electronic security barrier.

The articles of manufacture may include data lineage information. The data lineage information may include historical data lineage information.

The articles of manufacture may identify a threshold number of mismatches between TDEIs. For example, a threshold number of mismatches between TDEIs may include one mismatch, two mismatches, three mismatches, and more mismatches.

The articles of manufacture may include a location for saving the plurality of TDEIs. The location may include, for example, a server, database, schema, table/view, and column.

The articles of manufacture may include a query. The articles of manufacture may also include a query that spawns a child query.

The articles of manufacture may include a processor. The processor may be configured to generate a pointer. The processor may generate a pointer. The processor may use the pointer to associate the first TDEI with an SOR.

The articles of manufacture may include a computer. The computer may be configured to receive a plurality of TDEIs. The computer may be configured to receive a criterion. A criterion may be an access code, search string, tool, data, or metadata. A criterion may be required to access one or more of a plurality of technical data elements ("TDEs") associated with the plurality of TDEIs.

The computer may be configured to receive a data element management identifier. A data element management identifier may correspond to an entity that manages a data element; and an election to receive a notification for a transformation of data lineage information associated with the data element.

The TDEI may be one of a plurality of TDEIs. The TDEI may identify a TDE. A TDE may represent a data element. The TDEI may correspond to a TDE. The TDEI may represent a TDE.

The query may include an input term. The input term may be an identifier. The identifier may be a TDEI. The TDEI may correspond to any suitable TDE. The identifier may be a numerical identifier, alphabetical identifier, symbol, pictographic identifier, code, or any other suitable identifier. The identifier may be a data identifier. The data identifier may correspond to any of the data elements in Table 1. The data identifier may correspond to any suitable data element.

TABLE 1

Illustrative Data Elements

Data Elements

Personal Information
Location
Address
Social Security Number
Debit Card
Credit Card
Duration
State
Postal Code
Account Balance
Checking
Manufacturing
Duration
Services
Region
Category
Merchant Name
Payment Instrument
ACH
Automated Teller Machine ("ATM")
Cash
Home Equity
Credit Line
Identifier
Corporate
E-mail address
Password
Username
Telephone Number
Payee
Recent Activity
Outstanding debt
Accounts
Accounts Payable
Accounts Receivable
Accrual
Interest
Dispute
Gross
Net
Capital
Expenditures
Overhead
Appreciation
Dependents
Return
Tax
Primary
IRA
401(k)
Investment
Mortgage
Lease
Home
Auto
Investment Banking
Wealth Management
Trade
Sales
Commission
Government
Rules
Law
Balance
Statement
Value
Market
Discount
Bond
Treasury
Stock
Mutual Fund
System of Record
Line of data
Manager
Unit TABLE 1-continued Illustrative Data Elements Database
Data Unit
Group
Compliance
Consumer Credit
Commercial Products The disclosure provides a search portal that may utilize an outside vender supplier for software to find data lineage information.

The disclosure provides a search portal for data lineage information that may use a five-part key. The five-part key may include TDEIs. The search portal may include a lineage server. The search portal may include a query for data location lineage. The search portal may include a query for database lineage. The search portal may include a query for server lineage. The search portal may include a query for column lineage.

The disclosure provides a search portal using, for example, a drill down method, a bottom-up method, and a wildcard method for finding data lineage information. A drill down method traces data lineage backwards from end point to origin source. A bottom-up method traces data lineage forwards from origin source to end point. A wildcard method traces data lineage and allows for variations between a search query TDEI (a first TDEI) and a date lineage TDEI (a second TDEI). The variations allowed may be a threshold number of mismatches between the first and second TDEIs, for example, one, two, or more mismatches.

The search portal may include a query, for example, for lineage of personal ID number. The search portal may query, for example, where the personal ID number originated from and where the personal ID number is going. The search portal may then find the actual data element, its lineage origin, and its pathway.

The search portal may include, for example, a data lookup table. The data lookup table may include, for example, a database search. For example, a search string may be a "*Ficus* tree." The data lookup table may then look for any variations of "*Ficus* tree," and these variations may be looked up in databases as well.

The search portal may include a five-part key, including KDEIs. For example, a user may enter information into an application and provide information to render a database called "KScope." Kscope may then be filled in with data.

The search portal may prompt the user for more information if at least one part of the five-part key does not match a second TDEI or KDEI.

The search portal may utilize at least three options for matching TDEIs:
  (1) The search portal may utilize drill down matching. Drill down matching is a way to match TDEIs by staring from the end source and drilling down through the data flow pathway toward the data origin source. Each TDEI must have an exact match in drill matching.
  (2) The search portal may utilize bottom-up matching. Bottom-up matching starts from the data in source and works toward the endpoint of the data. But this requires high levels of bandwidth and tune.
  (3) The search portal may utilize a wildcard system for matching. A wildcard system is a search portal that continues searching for closely related matches—but not necessarily exact matches. For example, a TDEI comparison between "KScope" and "KScopes" reveals one mismatch (one has an 's' at the end, and one does not). The wildcard system will not stop searching if it sees, for example, one mismatch. The wildcard system is aware that mistakes may be made and may account for mistakes on some threshold level.

The search portal may utilize a rule set for a threshold level of mismatches allowed. For example, the tools may allow for one mistake or mismatch. The tools may also allow for two mistakes or mismatches. If the comparison between TDEIs exceeds two mismatches, for example, the system will not allow data lineage searching to proceed with the mismatched TDEIs.

The search portal may utilize an algorithm that allows for close matches but disallows too many mismatches, which may not provide meaningful or helpful information.

The disclosure may provide a search crawler that stops searching when the number of mismatches reaches a threshold level. The threshold level may be set as 1, 2, 3, 4, 5, 6, 7, 8, 9, or 10 mismatches. The threshold level, for example, may be set to 2 mismatches. The threshold level may be set to a variable number of mismatches.

The disclosure may provide a system that limits data lineage mistakes and simultaneously keeps bandwidth available. If bandwidth suffers because of processing, the system would be less useful. Thus, the disclosed system maintains bandwidth, in addition to search accuracy.

The disclosure may provide a search crawler that may crawl across information in different ways. If the crawler finds a successful match, the data element may be added to a list. The system may be limited to, for example, 100 options that the user may receive.

Further, the system may rank the data elements—not only by how many letters—but by how close alphabetically the data element is to the correct element. For example, one or two mistakes may be allowed. The mistakes may be weighed and ranked, together and separately.

The search portal may include a query for a top-level data element, which may be designated more critical for matching. There may be matching levels corresponding to databases, schemas, etc. For example, a query for a data element describing "Istanbul, Turkey," may pull up information for "Perth, Australia" or "Athens, Greece." When compared, information for "Australia" or "Greece" is different with respect to the requested data element, "Turkey." For example, Greece is physically closer to Turkey than to Australia, so there is a chance that Greece is the correct data lineage information. The wildcard system may then be coded to prompt the user to select the correct data lineage information. A user may replace "Greece" for "Turkey," and vice versa, depending on the ranking and weighing of data lineage comparisons and mismatches.

The apparatus, methods, and articles of manufacture for a self-service data lineage search portal may be on the client side or public side—not based on back-end or private processing. Being on the client side means that the systems and tools may be based on a personal, public browser, such as Internet Explorer. For example, the self-service data lineage search portal may be a public search tool. The search portal may be private only in terms of a server—the server may be a private server.

The search portal may provide a "survival of the fittest" search method. A "survival of the fittest search method" is a method that searches for a search string, as well as a threshold number of closely related comparisons. Only a threshold level of closely related terms may survive the search. For example, the search portal may compare the following TDEIs: "KScope" and "KScopes." A user may rank "KScopes" based on threshold difference from the user request, "KScope."

This type of system would normally require effort and bandwidth. Thus, the search portal provided uses a "survival of the fittest" search method and does not store ineligible search results. In other words, the search portal has no need to loop through unnecessary results or keep track of losing matches. Only the positive results are stored and saved.

As will be appreciated by one of skill in the art, the disclosure described herein may be embodied in whole or in part as a method, a data processing system, or a computer program product. Accordingly, the disclosure may take the form of entirely hardware, entirely software, or combining software, hardware and any other suitable approach or apparatus.

Furthermore, such aspects may take the form of a computer program product stored by one or more computer-readable storage encoded media having computer-readable program code, or instructions, embodied in or on the storage encoded media. Any suitable computer readable storage encoded media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting encoded media such as metal wires, optical fibers, and/or wireless transmission encoded media (e.g., air and/or space).

Illustrative information that is exchanged with the system may be transmitted and displayed using any suitable markup language under any suitable protocol, such as those based on JAVA, COCOA, XML, or any other suitable languages or protocols.

Processes in accordance with the principles of the disclosure may include one or more features of the processes illustrated in FIGS. 3-9. For the sake of illustration, the steps of the processes illustrated in FIGS. 3-9 will be described as performed by a "system." The "system" may include one or more of the features of the apparatus that are shown or described herein and/or any other suitable device or approach. The "system" may be provided by an entity. The entity may be an individual, an organization or any other suitable entity.

Systems and methods described herein are illustrative. Systems and methods in accordance with this disclosure will now be described in connection with the figures, which form a part hereof. The figures show illustrative features of system and method steps in accordance with the principles of this disclosure. It is understood that other embodiments may be utilized, and that structural, functional, and procedural modifications may be made without departing from the scope and spirit of the present disclosure.

FIG. 1 shows an illustrative block diagram of system 100 that includes computer 101. Computer 101 may alternatively be referred to herein as a "server" or a "computing device." Computer 101 may be a workstation, desktop, laptop, tablet, smart phone, or any other suitable computing device. Elements of system 100, including computer 101, may be used to implement various aspects of the systems and methods disclosed herein.

Computer 101 may have a processor 103 for controlling the operation of the device and its associated components, and may include RAM 105, ROM 107, input/output module 109, and a memory 115. The processor 103 may also execute all software running on the computer—e.g., the operating system and/or voice recognition software. Other components commonly used for computers, such as EEPROM or Flash memory or any other suitable components, may also be part of the computer 101.

Memory 115 may be comprised of any suitable permanent storage technology—e.g., a hard drive. The memory 115 may store software including the operating system 117 and application(s) 119 along with any data 111 needed for the operation of the system 100. Memory 115 may also store videos, text, and/or audio assistance files. The videos, text, and/or audio assistance files may also be stored in cache memory, or any other suitable memory. Alternatively, some or all of computer executable instructions (alternatively referred to as "code") may be embodied in hardware or firmware (not shown). Computer 101 may execute the instructions embodied by the software to perform various functions.

Input/output ("I/O") module may include connectivity to a microphone, keyboard, touch screen, mouse, and/or stylus through which a user of computer 101 may provide input. The input may include input relating to cursor movement. The input may relate to database backup, search, and recovery. The input/output module may also include one or more speakers for providing audio output and a video display device for providing textual, audio, audiovisual, and/or graphical output. The input and output may be related to computer application functionality. The input and output may be related to database backup, search, and recovery.

System 100 may be connected to other systems via a local area network (LAN) interface 113.

System 100 may operate in a networked environment supporting connections to one or more remote computers, such as terminals 141 and 151. Terminals 141 and 151 may be personal computers or servers that include many or all the elements described above relative to system 100. The network connections depicted in FIG. 1 include a local area network (LAN) 125 and a wide area network (WAN) 129 but may also include other networks. When used in a LAN networking environment, computer 101 is connected to LAN 125 through a LAN interface or adapter 113. When used in a WAN networking environment, computer 101 may include a modem 127 or other means for establishing communications over WAN 129, such as Internet 131.

It will be appreciated if the network connections shown are illustrative and other means of establishing a communications link between computers may be used. The existence of various well-known protocols such as TCP/IP, Ethernet, FTP, HTTP, and the like is presumed, and the system can be operated in a client-server configuration to permit a user to retrieve web pages from a web-based server. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Additionally, application program(s) 119, which may be used by computer 101, may include computer executable instructions for invoking user functionality related to communication, such as e-mail, Short Message Service (SMS), and voice input and speech recognition applications. Application program(s) 119 (which may be alternatively referred to herein as "plugins," "applications," or "apps") may include computer executable instructions for invoking user functionality related performing various tasks. The various tasks may be related to database backup, search, and recovery.

Computer 101 and/or terminals 141 and 151 may also be devices including various other components, such as a battery, speaker, and/or antennas (not shown).

Terminal 151 and/or terminal 141 may be portable devices such as a laptop, cell phone, Blackberry™, tablet, smartphone, or any other suitable device for receiving, storing, transmitting and/or displaying relevant information. Terminals 151 and/or terminal 141 may be other devices. These devices may be identical to system 100 or different. The differences may be related to hardware components and/or software components.

Any information described above in connection with database 111, and any other suitable information, may be stored in memory 115. One or more of applications 119 may include one or more algorithms that may be used to implement features of the disclosure, and/or any other suitable tasks.

The disclosure may be operational with numerous other general purpose or special purpose computing system environments or configurations. Examples of well-known computing systems, environments, and/or configurations that may be suitable for use with the disclosure include, but are not limited to, personal computers, server computers, hand-held or laptop devices, tablets, mobile phones, smart phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The disclosure may be described in the general context of computer-executable instructions, such as program modules, being executed by a computer. Generally, program modules include routines, programs, objects, components, data structures, etc., that perform tasks or implement abstract data types. The disclosure may also be practiced in distributed computing environments where tasks are performed by remote processing devices that are linked through a communications network. In a distributed computing environment, program modules may be in both local and remote computer storage media including memory storage devices.

Figure 2:
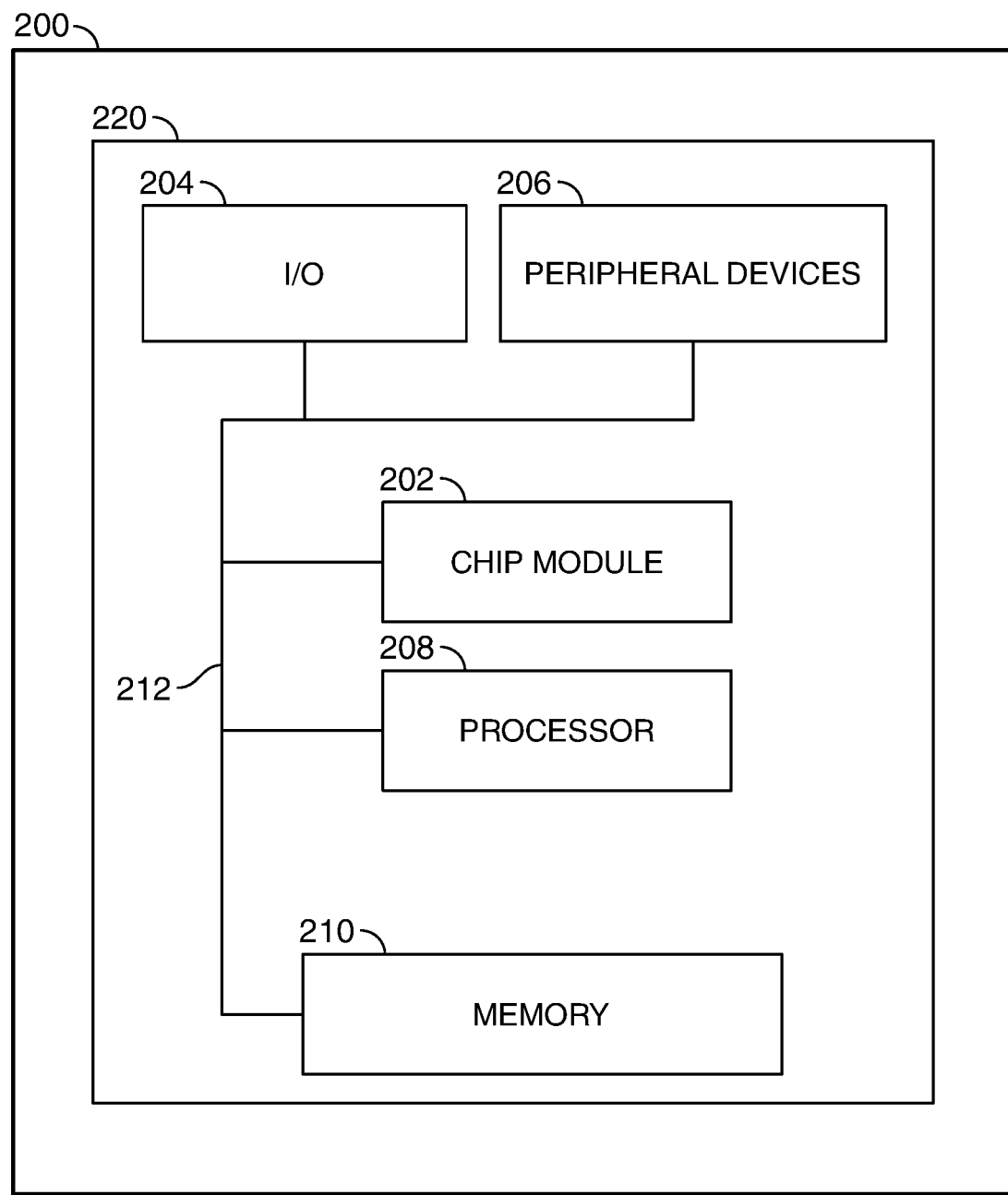
FIG. 2 shows illustrative information in accordance with the principles of the disclosure along with some of the apparatus shown in FIG. 1.

FIG. 2 shows illustrative apparatus 200 that may be configured in accordance with the principles of the disclosure. Apparatus 200 may be a computing machine. Apparatus 200 may include one or more features of the apparatus shown in FIG. 1. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a computer device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions (which may be alternatively referred to herein as "computer instructions" or "computer code"), applications, signals, and/or any other suitable information or data structures.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
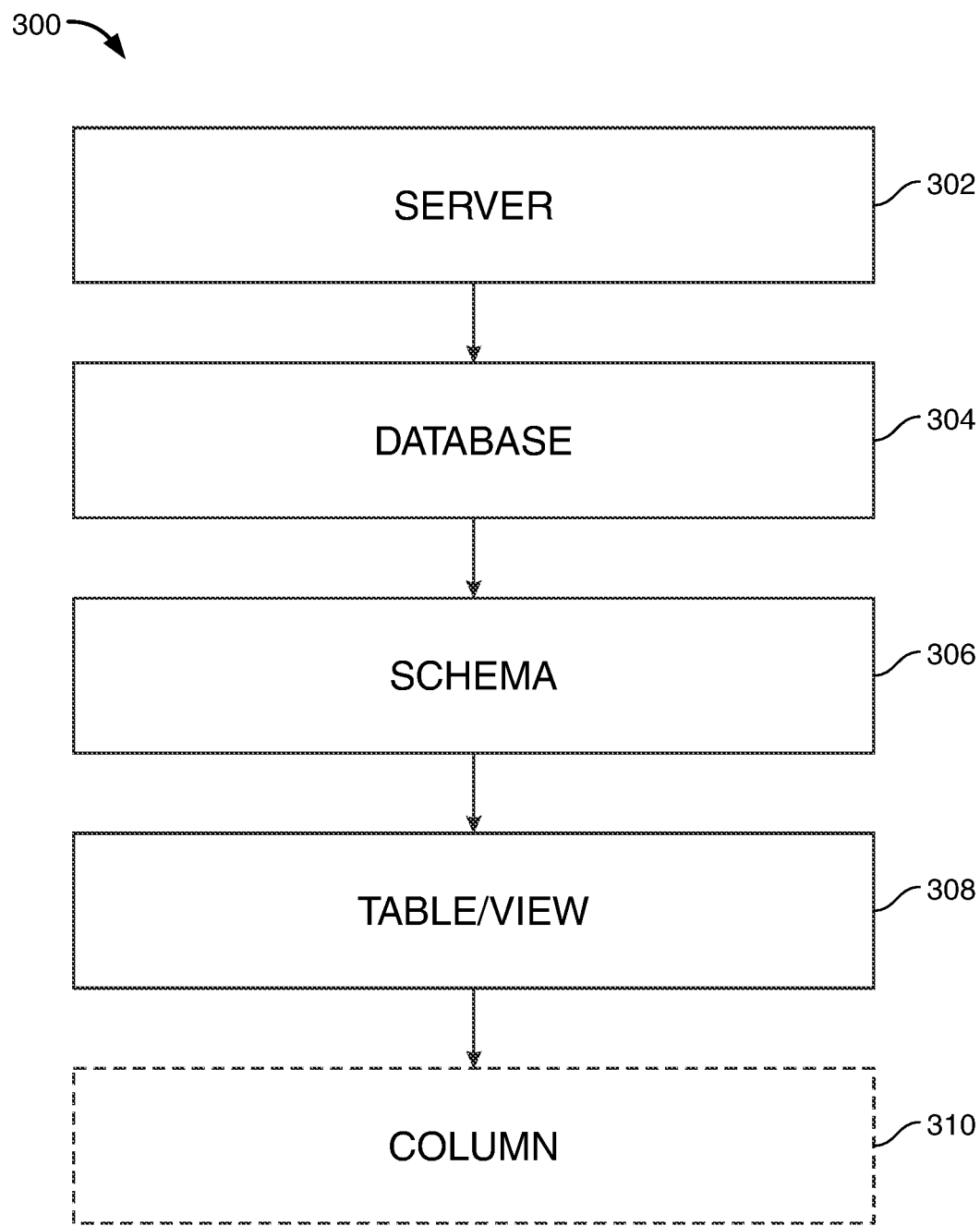
FIG. 3 shows an illustrative information flow diagram in accordance with the principles of the disclosure.

FIG. 3 shows an illustrative flowchart of the methods and systems in accordance with principles of the disclosure. FIG. 3 shows a data storage structure 300 for a data lineage self-service search portal. FIG. 3 may be broken down into more detailed segments represented by FIGS. 7-8 below.

The apparatus, articles of manufacture, and methods may use data storage systems beginning with server 302. Server 302 may store data, and specifically data lineage, further located within database 304. Database 304 may further store data within schema 306. Schema 306 may also store a table/view 308. And table/view 308 may then also store column 310.

According to the illustrative flowchart, server 302 flows into database 304. Database 304 flows into schema 306. Schema 306 flows into table/view 308. And table/view 308 flows into column 310.

Figure 4:
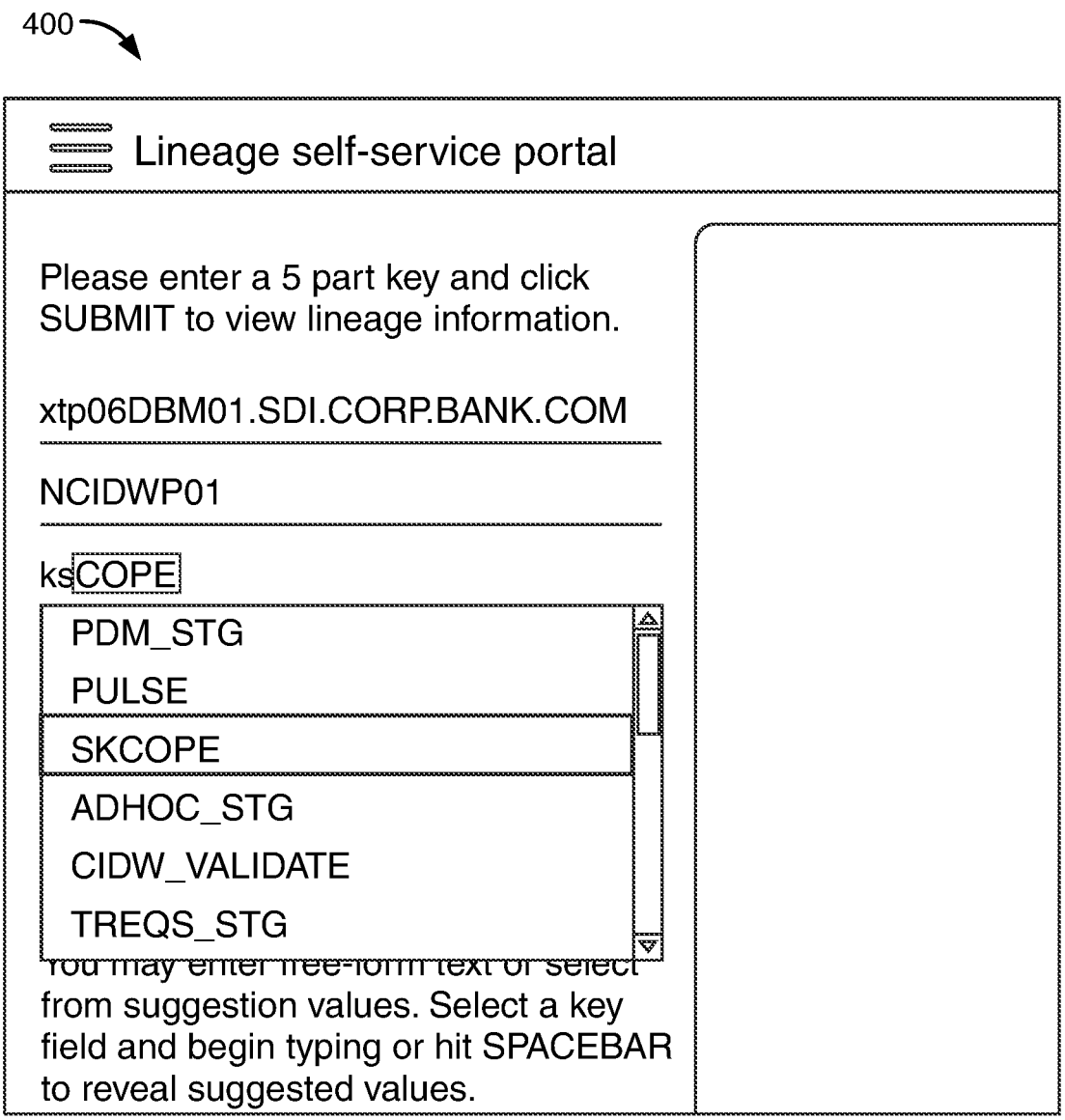
FIG. 4 shows an illustrative apparatus in accordance with the principles of the disclosure.

FIG. 4 shows illustrative lineage self-service portal 400 as an assist user input. Lineage self-service portal 400 may include data lineage information. The data lineage information may be TDE lineage information. The TDE may be a KDE.

Lineage self-service portal 400 may be accessed by a GUI. Lineage self-service portal 400 may be a drill-down view. The GUI may display lineage information from a TDEI drill-down view.

Lineage self-service portal 400 may include a plurality of TDEIs. A TDEI may correspond to a TDE. The lineage self-service portal 400 may prompt a user to: "Please enter a 5 part key and click SUBMIT to view lineage information." The lineage self-service portal 400 may also indicate: "You may enter free-form text or select from suggestion values. Select a key field and begin typing or hit SPACE-BAR to reveal suggested values."

Lineage information may be obtained via a 5-part key. The 5-part key may be represented by, for example, "xtp06DBM01.SDI.CORP.BANK.COM" database system server, "NCIDWP01" database, "ksCOPE" schema, "CIG_TRADEBLOTTER" table, and "LOT" ID number.

One goal of the present disclosure is to provide a search GUI that may guide users to their needs while allowing for improbable input values. The solution provided is to allow users to manually input values or choose from suggested dropdown values. The system may populate, and sort dropdown choices based on parent key components (classic drill-down method) or based on child elements. The detailed information may include, for example, "ksCOPE." The dropdown choices may then include, for example, "KSCOPE," as an option to choose from.

Figure 5:
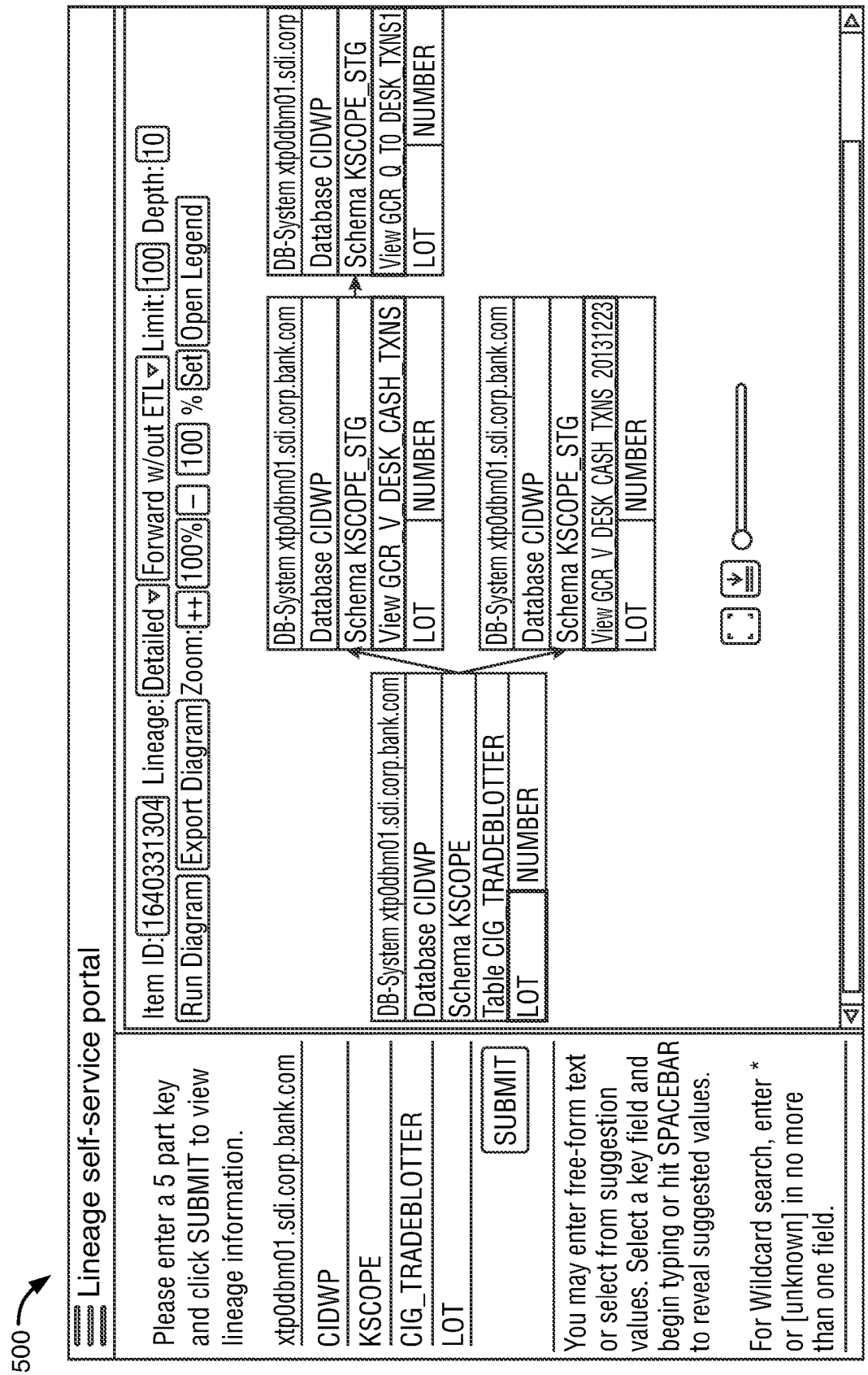
FIG. 5 shows another illustrative apparatus in accordance with the principles of the disclosure along with some of the apparatus shown in FIG. 4.

FIG. 5 shows an illustrative apparatus in accordance with the principles of the disclosure.

The lineage self-service portal 500 may display: "For Wildcard search, enter * or [unknown] in no more than one field."

Lineage information may be obtained via a 5-part key. The 5-part key may be represented by, for example, "xtp0dbm01.sdi.corp.bank.com" database system server, "CIDWP" database, "KSCOPE" schema, "CIG_TRADEBLOTTER" table, and "LOT" ID number.

The lineage self-service portal 500 shows data lineage changes from a Table "CIG_TRADEBLOTTER" to a View "GCR_V_DESK_CASH_TXNS" and a View "GCR_V_DESK_CASH_TXNS_20131223." The View "GCR_V_DESK_CASH_TXNS" also changed into "View GCR_Q_T0_DESK TXNS1." Further, Schema "KSCOPE" changed into Schema "KSCOPE_STG." Lineage self-service portal 500 may track the data lineage information and may allow for threshold variations and mismatches between the query TDEIs and the data lineage TDEIs.

FIG. 6 shows an illustrative apparatus in accordance with the principles of the disclosure. FIG. 6 shows illustrative query parameter 600 for the disclosed process for requesting data lineage. Query parameter 600 may be a detailed view. The detailed view may display columns.

Query parameter 600 may contain columns including, but not limited to, "Name," "Scope," and "Tags." Further, the columns may be filtered by "DB System" also known as "Server," "Database," "DB Schema" or "Schema," and "Table or View."

Query parameter 600 may contain a warning regarding a limited list size. For example, "Warning: The drill-down filter contains a limited list of 100 objects. You may define a more specific name pattern."

Figure 7:
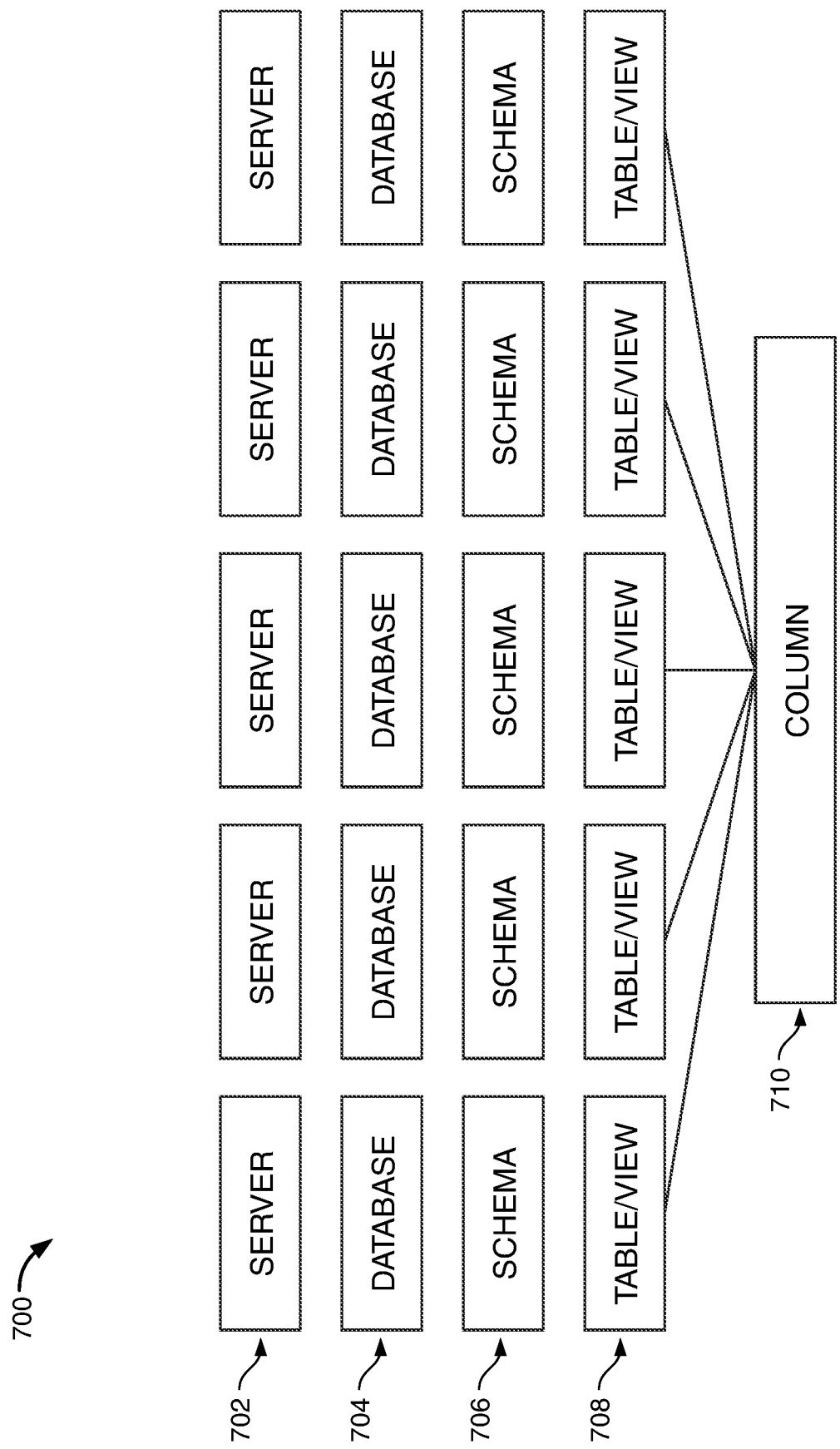
FIG. 7 shows another illustrative information flow diagram in accordance with the principles of the disclosure along with some of the flow diagram shown in FIG. 3.

FIG. 7 shows an illustrative flowchart 700 according to the principles of the disclosure.

Option 1: drill down matching. Drill down matching for data lineage information may include one or more servers, databases, schemas, table/views, and columns. Vertical rows 702, 704, 706, 708, and 710 may display one or more TDEIs. The TDEIs may be any suitable alphanumeric identifier. The TDEIs may be randomly generated.

If all fields match a record in the database, this method can confirm that match. These methods require exact matches in all fields.

Option 2: bottom-up matching. A bottom-up match for data lineage information may include one or more servers, databases, schemas, table/views, and columns. Bottom-up matching may take a user search query, begin from Column 710, and work its way up vertical rows 708, 706, 704, and 702, back up to the initial query TDEI.

For a bottom-up match, close matches could be detected, but the column values would have to be precise matches, because they are the bases of the query.

Different levels of matching may be used. For example, Column 710 may go up to Table/View 708. Table/View 708 may go up to Schema 706. Schema 706 may go up to Database 704. And Database 704 may go up to Server level 702.

Option 3: Drill down with wildcard abilities. Drill down with wildcard abilities presents a "survival of the fittest" search option. For example, a user may consider TDEIs: "KScope" vs. "KScopes." A user may rank these TDEIs based on a threshold distance from the user request. To preserve effort and bandwidth, the drill down with wildcard abilities system provided does not require storing of ineligible search results.

In the drill down with wildcard option, alternative combinations are suggested. Each query call may then be evaluated. If, for example, no more than one mismatch is found, the query may spawn a child entry. Otherwise, the request may be closed. This method is called a "survival of the fittest" method because there is no need to loop through ineligible results or keep track of losing matches. The correct match may be selected, initiating an automatic TDEI update with respect to data lineage information.

Row 702 may display server information for its associated TDEIs. The server information may contain the physical location of its associated TDEs.

Row 704 may display database information of its associated TDEIs. The database information may be a SOR. The database information may be a physical location in memory.

Row 706 may display schemas associated with the TDEIs.

Row 708 may display table/view information associated with the TDEIs.

Row 710 may display column information associated with the TDEIs.

Row 702 may drill down into Row 704. Row 704 may drill down into Row 706. Row 706 may drill down into Row 708. Row 708 may drill down into Column 710.

Figure 8:
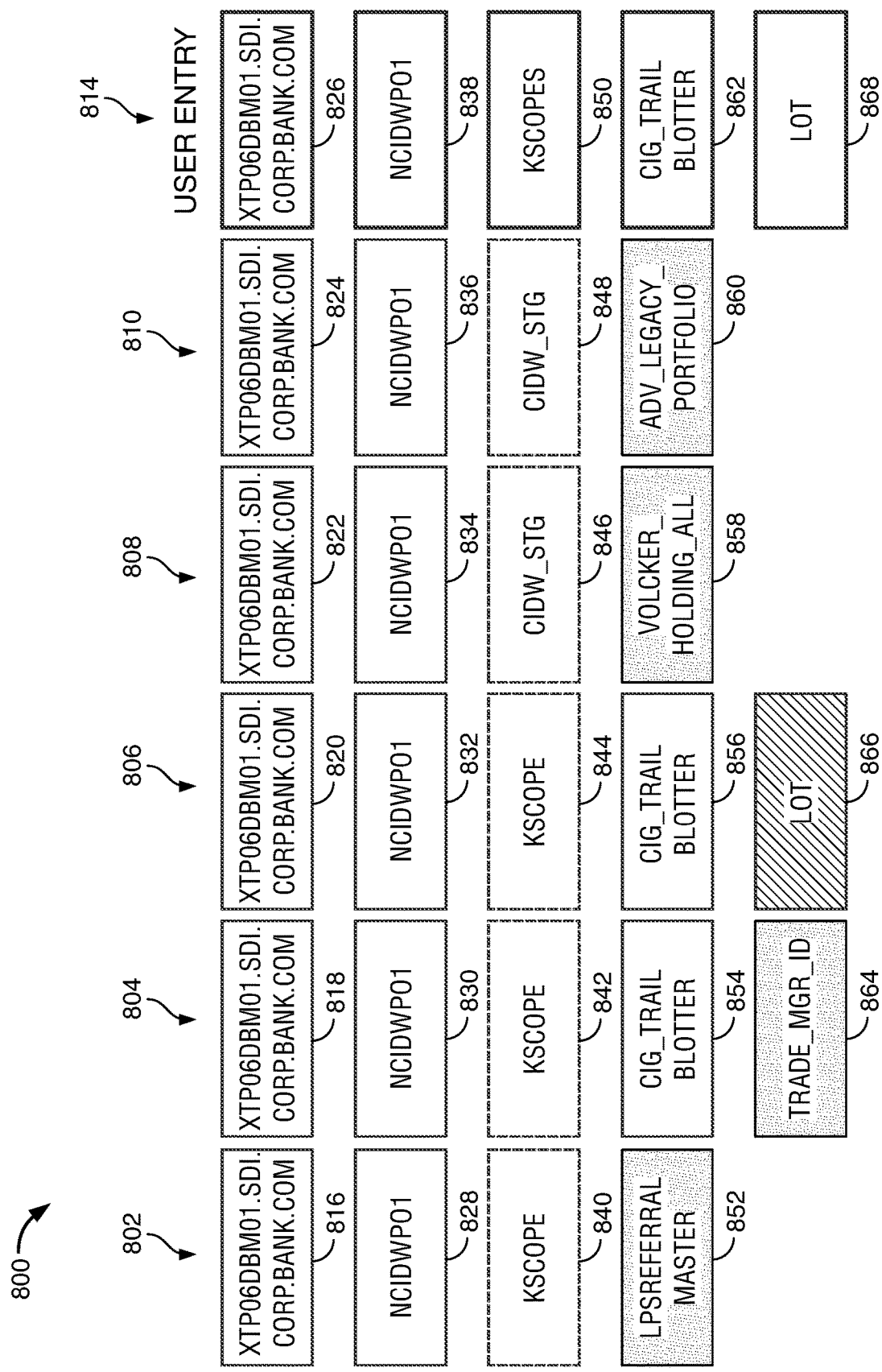
FIG. 8 shows yet another illustrative information flow diagram in accordance with the principles of the disclosure along with some of the flow diagram shown in FIG. 7.

A TDE may be uniquely identified by a TDEI that may include a combination of metadata elements. The metadata elements may include one or more of TDEIs, servers 702, databases 704, schemas 706, table/views 708, column 710, or any other suitable metadata. The specific TDEI may associate the TDE with a single TDE. The TDEI may associate the TDE with a data element. FIG. 8 shows an illustrative lineage self-service portal 800.

At step 814, the system may input a user entry, for example, TDEIs. The user entry may be associated with a datum. The datum may be a TDE. The TDE may be associated with a TDEI.

The TDE may be a KDE. The KDE may be associated with a KDEI. The TDE may be re-categorized as a KDE. The TDEI may be re-categorized as a KDEI. The KDE may be stored in a first database as a TDE. The KDEI may correspond to a KDE stored in a first database as a KDE. The KDE may be stored in a second database as a KDE. The KDEI may correspond to a KDE stored in a second database as a KDE. The TDE may be flagged as a KDE. The TDEI may be flagged as a KDEI.

Row 802 may correspond to servers. Row 804 may correspond to databases. Row 806 may correspond to schema. Row 808 may correspond to table/views. Row 810 may correspond to columns.

At step 814, the system may receive a query. The query may be a request. The request may be a request for information. The request may be a request to retrieve information. The information may be lineage information. The lineage information may be data lineage information.

The data lineage information may correspond to a TDE. The TDE may be any suitable data element. Exemplary data elements are shown above in Table 1.

The data element may be associated with a TDEI. The system may receive a request to retrieve data lineage information corresponding to the TDEI.

User entry 814 may include a query including a 5-part TDEI including server 826 "XTP06DBM01.SDI.CORP.BANK.COM," database 838 "NCIDWPO1," schema 850 "KSCOPES," table/view 862 "CIG_TRAILBLOTTER," and column 868 "LOT."

Server 826 "XTP06DBM01.SDI.CORP.BANK.COM" may be an exact match to servers 816, 818, 820, 822, and 824. Further, database 838 "NCIDWP01" may be an exact match to databases 828, 830, 832, 834, and 836.

But Schema 850 "KSCOPES" may not be an exact match for other TDEIs. For example, schemas 840, 842, and 844, "KSCOPE," has one mismatch (lacking S at the end) relative to the query TDEI: "KSCOPES." Furthermore, schemas 846 and 848, "CIDW_STG," has more than two mismatches (no matches) relative to the query TDEI: "KSCOPES." Thus, schemas 840, 842, and 844 may still be possible options for correct data lineage information while schemas 846 and 848 (more than two mismatches) may be eliminated from the search.

Table/view 862 "CIG_TRAILBLOTTER" may not match TDEIs table/view 852 "LPSREFERRALMASTER," table/view 858 "VOLCKER HOLDING ALL," or table/view 860 "ADV_LEGACY_PORTFOLIO." But table/view 862 "CIG_TRAILBLOTTER" may match table/view 854 and 856, "CIG_TRAILBLOTTER."

Finally, column 868 "LOT" may match only with column 866 "LOT" and not column 868 "TRADE_MGR_ID." In this case, the TDEIs 820, 832, 844, 856, and 866 are almost an identical match to the query TDEI. There is only one mismatch between the TDEIs, specifically at the schema level, "KSCOPES" vs. "KSCOPE." The search portal may apply its wildcard ability to allow a dropdown bar for user to choose the correct TDEI corresponding to the correct TDE for data lineage.

Figure 9:
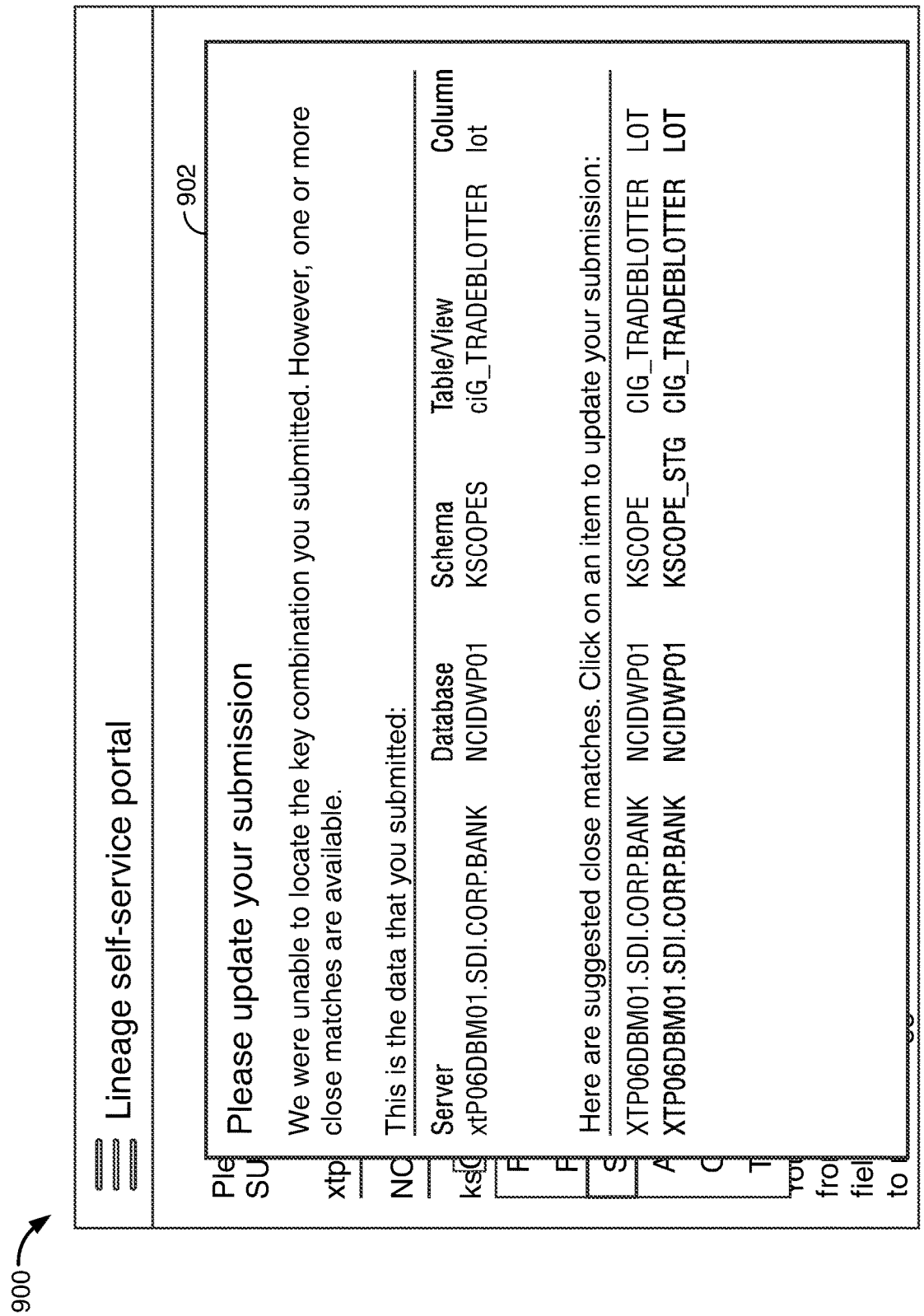
FIG. 9 shows still another illustrative apparatus in accordance with the principles of the disclosure.

FIG. 9 shows an illustrative apparatus in accordance with the principles of the disclosure.

Lineage self-service portal 900 may include heading "Please update your submission" 902.

Lineage self-service portal 900 may display one or more TDEIs. The TDEI may be any suitable identifier, such as an alphanumeric identifier. The TDEI may be associated with a TDE, including, but not limited to, server, database, schema, table/view, and column.

Lineage self-service portal 900 may include a plurality of TDEIs. A schema TDEI may be, for example, "KSCOPES," "KSCOPE" or "KSCOPE_STG."

For example, a user entry or query may be "XTP06," "NCIDWP01," "KSCOPES," "ciG_TRADEBLOTTER," and "lot." The system may find an exact match for each TDEI ("XTP06," "NCIDWP01," "ciG_TRADEBLOTTER," and "lot"), but not for "KSCOPE." The system may handle the user request and may allow for one, two, or more mismatches. Thus, there may be no need for the system to loop results through or keep track of winning matches.

The GUI in the lineage self-service portal 900 may prompt a user: "We were unable to locate the key combination you submitted. However, one or more close matches are available." The GUI may then prompt the user: "Here are suggested close matches. Click on an item to update your submission: Server: XTP06DBM01.SDI.CORP.BANK; Database: NCIDWP01; Schema: KSCOPE; Table/View: CIG_TRADEBLOTTER, and LOT or Server: XTP06DBM01.SDI.CORP.BANK; Database: NCIDWP01; Schema: KSCOPE_STG; Table/View: CIG_TRADEBLOTTER, and LOT." The first TDEI: "KSCOPES" may correspond to a second TDEI, for example "KSCOPE" or "KSCOPE_STG." The TDEIs may also be KDEIs that may unlock electronic security barriers.

If a threshold number of mismatches does not exist between the first TDEI and the second TDEI, the user may then be prompted, using an interactive GUI, to replace the first TDEI with the second TDEI in all relevant storage locations.

And, if a threshold number of mismatches exists between the first TDEI and the second TDEI, the system may maintain the second TDEI in all relevant storage locations.

One of ordinary skill in the art will appreciate that the elements shown and described herein may be performed in other than the recited order and that one or more elements illustrated may be optional. The methods of the above-referenced embodiments may involve the use of any suitable elements, elements, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, apparatus, methods, and articles of manufacture for self-service search, discovery, and transformation of data lineage information are provided. Persons skilled in the art will appreciate that the present invention may be practiced by other than the described embodiments, which are presented for purposes of illustration and not of limitation. The present invention is limited only by the claims that follow.

What is claimed is:

1. Apparatus for leveraging machine learning ("ML") to selectively update stored code with updated code, the apparatus comprising:
   machine readable memory configured to store a plurality of technical data element identifiers ("TDEIs");
   a computer configured to receive a query for data lineage information corresponding to a first TDEI associated with a first data lineage source;
   a processor configured to leverage ML to:
      identify a level of commonality between the first TDEI and a second TDEI, wherein the level of commonality is greater than both a threshold length percentage and a threshold alpha-numerical matching percentage;
      identify data lineage information for the second TDEI corresponding to a second data lineage source;
      determine whether the first TDEI and the second TDEI share a threshold level of commonality, wherein the threshold level of commonality is greater than a threshold number of alpha-numerical matches associated with both the first TDEI and the second TDEI;
      following a determination that the first TDEI and the second TDEI share a level of commonality that is greater than the threshold level of commonality, identify one or more mismatches between the first TDEI and the second TDEI, a mismatch being a difference in an alpha-numerical symbol in both the first TDEI and the second TDEI; and
      determine whether a threshold number of mismatches exists between the first TDEI and the second TDEI; and
   an electronic switch configured to:
      in response to a determination that a threshold number of mismatches does not exist between the first TDEI and the second TDEI, running a script to access a plurality of data files and to overwrite data lineage information in the data files, and generating a display on a graphical user interface ("GUI") to prompt a user to overwrite the first TDEI with the second TDEI in a storage location containing the first TDEI, wherein the overwriting accelerates the running of the script and reduces a bandwidth of the computer;
      in response to a determination that a threshold number of mismatches exists between the first TDEI and the second TDEI, maintain the second TDEI in the storage location containing the first TDEI; and
      in response to a failure of the electronic switch to output a determination regarding a threshold number of mismatches existing between the first TDEI and the second TDEI, taking remedial action by generating a display on the GUI to prompt the user to input a new search query.

2. The apparatus of claim 1 wherein:
   the plurality of TDEIs comprises a Key Data Element identifier ("KDEI"); and
   the KDEI unlocks an electronic security barrier.

3. The apparatus of claim 1 wherein the data lineage information comprises historical data lineage information.

4. The apparatus of claim 1 wherein the threshold number of mismatches is one mismatch.

5. The apparatus of claim 1 wherein the threshold number of mismatches is two or more mismatches.

6. The apparatus of claim 1 wherein a location for saving the plurality of TDEIs comprises at least one of a server, database, schema, table/view, and column.

7. The apparatus of claim 1 wherein the query spawns a child query.

8. The apparatus of claim 1 wherein the processor:
   is configured to generate a pointer;
   generates a pointer; and
   uses the pointer to associate the first TDEI with a system of record ("SOR").

9. The apparatus of claim 1 wherein the computer is configured to receive:
   the plurality of TDEIs; and
   a criterion required to access one or more of a plurality of technical data elements ("TDEs") associated with the plurality of TDEIs.

10. The apparatus of claim 1 wherein the computer is configured to receive:
    a data element management identifier corresponding to an entity that manages the second TDEI; and
    an election to receive a notification for a transformation of data lineage information associated with the second TDEI.

11. An article of manufacture comprising a non-transitory computer usable medium having computer readable program code embodied therein, the code when executed by a processor leveraging machine learning ("ML") causes a computer to perform data lineage analysis within a self-service search portal, the computer readable program code in said article of manufacture comprising:
    computer readable program code for causing the computer to store a plurality of technical data element identifiers ("TDEIs");
    computer readable program code for causing the computer to receive a query for data lineage information corresponding to a first TDEI associated with a first data lineage source;
    computer readable program code for causing the computer to leverage ML to identify a level of commonality between the first TDEI and a second TDEI, wherein the level of commonality is greater than both a threshold length percentage and a threshold alpha-numerical matching percentage;
    computer readable program code for causing the computer to identify data lineage information for the second TDEI corresponding to a second data lineage source;
    computer readable program code for causing the computer to determine whether the first TDEI and the second TDEI share a threshold level of commonality, wherein the threshold level of commonality is greater than a threshold number of alpha-numerical matches associated with both the first TDEI and the second TDEI;
    computer readable program code for causing the computer to, following a determination that the first TDEI and the second TDEI share a threshold level of commonality, identify any mismatches between the first TDEI and the second TDEI, a mismatch being a difference in an alpha-numerical symbol in both the first TDEI and the second TDEI, and determine whether a threshold number of mismatches exists between the first TDEI and the second TDEI; and computer readable program code for causing the computer to configure an electronic switch to:

in response to a determination that a threshold number of mismatches does not exist between the first TDEI and the second TDEI, running a script to access a plurality of data files and to overwrite data lineage information in the data files, and generating a display on a graphical user interface ("GUI") to prompt a user to overwrite the first TDEI with the second TDEI in a storage location containing the first TDEI, wherein the overwriting accelerates the running of the script and reduces a bandwidth of the computer;

in response to a determination that a threshold number of mismatches exists between the first TDEI and the second TDEI, maintain the second TDEI in the storage location containing the first TDEI; and in response to a failure of the electronic switch to output a determination regarding a threshold number of mismatches existing between the first TDEI and the second TDEI, taking remedial action by generating a display on the GUI to prompt the user to input a new search query.

12. The article of manufacture of claim 11 wherein:

the plurality of TDEIs comprises a Key Data Element identifier ("KDEI"); and the KDEI unlocks an electronic security barrier.

13. The article of manufacture of claim 11 wherein the data lineage information comprises historical data lineage information.

14. The article of manufacture of claim 11 wherein the threshold number of mismatches is one mismatch.

15. The article of manufacture of claim 11 wherein the threshold number of mismatches is two or more mismatches.

16. The article of manufacture of claim 11 wherein a location for saving the plurality of TDEIs comprises at least one of a server, database, schema, table/view, and column.

17. The article of manufacture of claim 11 wherein the query spawns a child query.

18. The article of manufacture of claim 11 wherein the processor:

is configured to generate a pointer;

generates a pointer; and uses the pointer to associate the first TDEI with a system of record ("SOR").

19. The article of manufacture of claim 11 wherein the computer is configured to receive:

the plurality of TDEIs; and a criterion required to access one or more of a plurality of technical data elements ("TDEs") associated with the plurality of TDEIs.

20. The article of manufacture of claim 11 wherein the computer is configured to receive:

a data element management identifier corresponding to an entity that manages the second TDEI; and an election to receive a notification for a transformation of data lineage information associated with the second TDEI.

* * * * *